US008878890B2

(12) United States Patent  
Park et al.

(10) Patent No.: US 8,878,890 B2  
(45) Date of Patent: Nov. 4, 2014

(54) MOBILE TERMINAL

(75) Inventors: Jongseok Park, Gyeonggi-Do (KR); Seongteg Woo, Gyeonggi-Do (KR); Wansub Kim, Gyeonggi-Do (KR); Minsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 13/495,811

(22) Filed: Jun. 13, 2012

(65) Prior Publication Data

US 2013/0021427 A1 Jan. 24, 2013

(30) Foreign Application Priority Data

Jul. 20, 2011 (KR) .......................... 10-2011-0072144

(51) Int. Cl.  
*H04N 7/14* (2006.01)

(52) U.S. Cl.  
USPC .................................... 348/14.02; 455/575.4

(58) Field of Classification Search  
USPC ............... 379/330, 428.01; 455/575.1, 575.4; 348/14.02  
See application file for complete search history.

(56) References Cited

U.S. PATENT DOCUMENTS

2003/0064688 A1  4/2003 Mizuta et al.  
2008/0261659 A1* 10/2008 Jang et al. ..................... 455/566  
2010/0141830 A1  6/2010 Zhang

FOREIGN PATENT DOCUMENTS

EP  1471715 A1  10/2004  
EP  1701518 A2  9/2006

* cited by examiner

*Primary Examiner* — Olisa Anwah  
(74) *Attorney, Agent, or Firm* — Birch, Stewart, Kolasch & Birch, LLP

(57) ABSTRACT

A mobile terminal including a first body having a user input unit at one surface thereof; a second body slidably connected to the first body so as to be movable between a first state where the user input unit is exposed and a second state where the user input unit is covered by the second body; and a first image input unit located at the user input unit such that an external image is inputtable in the first state.

17 Claims, 12 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0072144, filed on Jul. 20, 2011, the contents of which is incorporated by reference herein in its entirety.

BACKGROUND OF THE INVENTION

1. Field of the Invention

The present disclosure relates to a mobile terminal, and particularly, to a mobile terminal having a structure in which one body performs sliding motion with respect to another body, and a camera is disposed on one body.

2. Background of the Invention

In general, a terminal may be classified into a mobile (portable) terminal and a stationary terminal. The mobile terminal may be also classified into a handheld terminal and a vehicle mount terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Various attempts have been made to implement complicated functions in such a multimedia device by means of hardware or software.

The related art mobile terminal is being evolved to have a design to provide more functions to a user, and to enhance portability. Recently, a mobile terminal having a touch input function and allowing a user to input text information through a QWERTY type keyboard is being spotlighted.

Furthermore, according to a user's high demands for video chatting, a mobile terminal provided with a QWERTY type keyboard and having a video chatting function may be considered.

A method may be considered so as to implement a mobile terminal capable of satisfying the above demands, having a slim configuration, and enhancing a user's convenience.

SUMMARY OF THE INVENTION

Therefore, an aspect of the detailed description is to provide a mobile terminal capable of having a slim configuration by arranging a plurality of cameras on one of two bodies which perform sliding motion with respect to each other.

Another aspect of the detailed description is to provide a mobile terminal capable of being easily manipulated by operating a camera according to sliding motion of one of two bodies.

To achieve these and other advantages and in accordance with the purpose of this specification, as embodied and broadly described herein, there is provided a mobile terminal, comprising: a first body having a user input unit on one surface thereof; a second body slidably connected to the first body so as to implement a first state where the user input unit is exposed to the outside and a second state where the user input unit is blocked; and a first image input unit formed on the user input unit such that an image of a region facing the one surface is input thereto in the first state.

The first image input unit may be formed to be rotatable based on one point such that the region onto which an image is input is converted.

The user input unit may include a key frame coupled to one surface of the first body for covering, and having at least one hole; and key bodies coupled to the key frame and having key marks on one surface thereof such that text information is input thereto. The first image input unit may be disposed on at least one of the holes.

An upper surface of the user input unit may include first regions frequently blocked by a user when the user inputs characters, and second regions blocked less frequently than the first regions. The first image input unit may be disposed on one of the second regions.

The first image input unit may include a housing having a camera module mounted therein, and a shaft protruding toward at least one end of the housing such that a facing angle to the housing is controlled with respect to an object to be captured.

The first body may include an accommodation portion configured to accommodate the housing therein, and a supporting unit formed on one side surface of the accommodation portion in correspondence to the shaft so as to support the shaft.

The mobile terminal may further comprise a slit penetratingly formed at the key frame close to a hole where the first image input unit is disposed, and a knob unit slidably formed at the slit so as to control an inclined angle of the housing.

The knob unit may include a control bar extending toward the inside of the slit, and the shaft may be formed to be rotatable in an engaged state with the control bar according to sliding motion of the knob unit.

The knob unit may include an extension portion having two ends extending along the slit, and protrusion portions formed on one surface of the extension portion.

The first body may be provided with grooves formed in correspondence to the protrusion portions such that sliding motion of the knob unit is controlled.

The mobile terminal may further comprise a second image input unit formed on another surface of the first body, a sensing unit configured to sense sliding motion of the second body, and a controller configured to control the operation of the first image input unit or the second image input unit according to a sensed sliding degree.

When the second body is in a state to block at least part of the first image input unit by sliding motion of the second body, the controller may convert the operation of each image input unit such that an image input through the first image input unit is converted into an image input through the second image input unit.

When the second body is in a state to block at least part of the first image input unit by sliding motion of the second body, the controller may simultaneously activate the first and second image input units, such that an image is output to a display unit of the second body.

To achieve these and other advantages and in accordance with the purpose of this specification, as embodied and broadly described herein, there is also provided a mobile terminal, comprising: a first body having a user input unit on one surface thereof; a second body slidably connected to the first body so as to implement a first state where the user input unit is exposed to the outside and a second state where the user input unit is blocked, and having a display unit; a first image input unit formed at the user input unit such that an image of a region facing the one surface is input thereto in the first state; a sensing unit configured to sense sliding motion of the second body; and a controller configured to control the operation of the first image input unit according to a sensed sliding degree.

When an application associated with a video call or video chatting is executed, a first screen may be output to the display unit, the first screen including image information input from the first image input unit or text information input from the user input unit.

When the second body is in a state to block at least part of the first image input unit by sliding, the first screen output to the display unit may be converted into a second screen.

When the mobile terminal is in the first state by sliding while the second screen is displayed, the second screen may be re-converted into the first screen.

The mobile terminal may further include a second image input unit formed on another surface of the first body. And, the controller may be configured to activate only one of the first and second image input units, or both of the first and second image input units according to a sliding state of the mobile terminal, and to display the activated image input unit on the display unit.

The mobile terminal according to the present disclosure may have the following advantages.

Firstly, one body may not be provided with the image input unit. This may allow the mobile terminal to have a slim configuration.

Secondly, since the image input unit may be formed at one of the two bodies, manufacturing processing of the mobile terminal may be simplified and productivity may be enhanced.

Thirdly, a user may correct his or her image information to be transmitted to another party in a simple manipulation manner during a video call or video chatting.

Fourthly, the image input unit may be disposed at a predetermined region of the user input unit where an image input is not interfered while a user inputs characters using the user input unit. This may enhance the user's convenience.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present disclosure may be also applicable to a fixed terminal such as a digital TV and a desktop computer.

Figure 1:
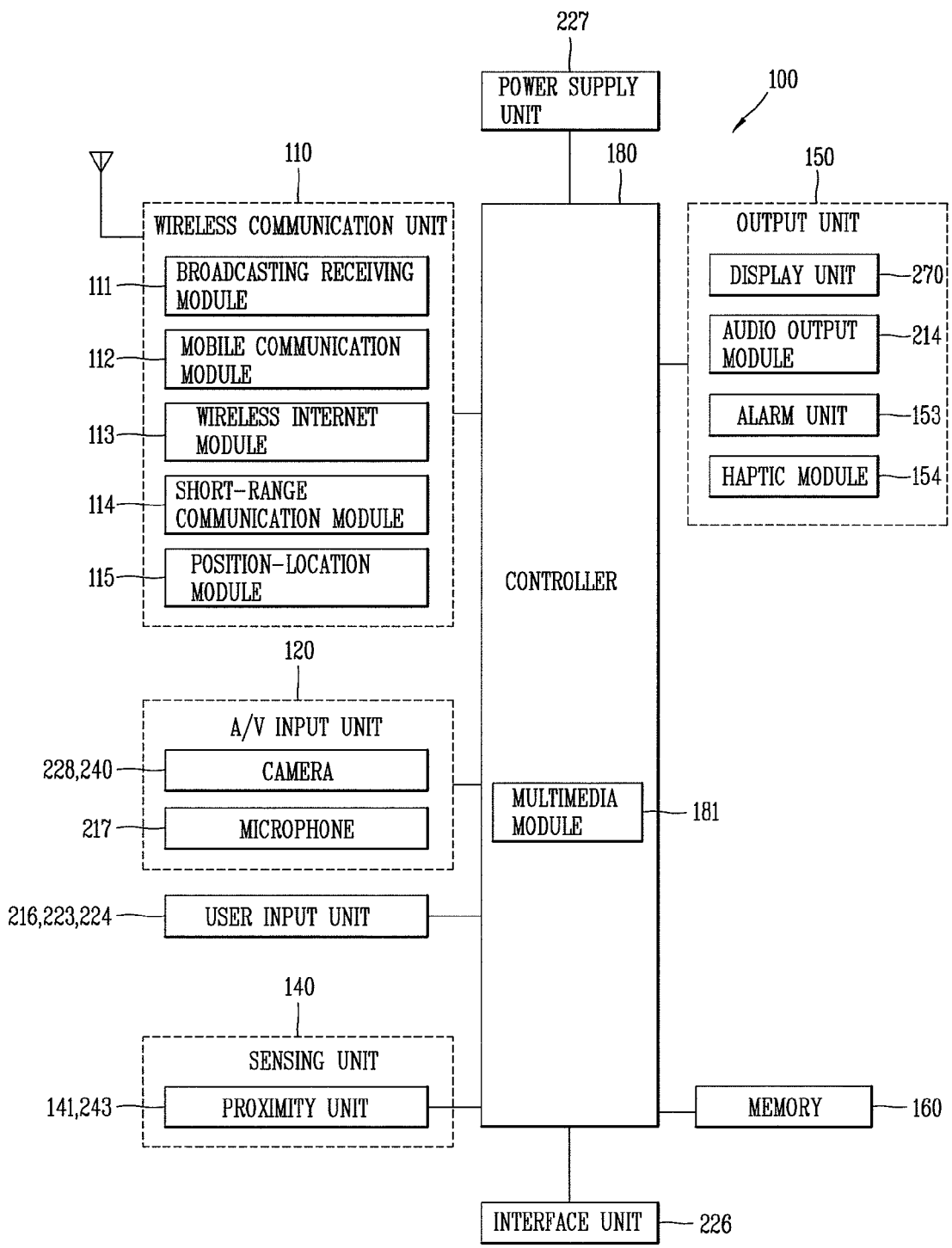
FIG. 1 is a block diagram of a mobile terminal according to the present disclosure.

FIG. 1 is a block diagram of a mobile terminal according to one embodiment of the present disclosure.

The mobile terminal 100 may comprise components, such as a wireless communication unit 110, an Audio/Video (A/V) input unit 120, user input units 216, 223 and 224, a sensing unit 140, an output module 150, a memory 160, an interface unit 226, a controller 180, a power supply unit 227, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include cameras 228 and 240, a microphone 217 or the like. The cameras 228 and 240 process image data of still pictures or video acquired by an image capture device in a video capturing mode or an image capturing mode. The processed image frames may be displayed on a display unit 270.

The image frames processed by the cameras 228 and 240 may be stored in the memory 160 or transmitted via the wireless communication unit 110. Two or more cameras 228 and 240 may be provided according to the configuration of the mobile communication terminal.

The microphone 217 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 217 may implement various types of noise canceling (or suppression) algorithms to cancel (or suppress) noise or interference generated in the course of receiving and transmitting audio signals.

The user input units 216, 223 and 224 may generate key input data from commands entered by a user to control various operations of the mobile communication terminal. The user input units 216, 223 and 224 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 227 supplies power or whether or not the interface unit 226 is coupled with an external device. The sensing unit 140 may include a proximity sensor 141.

The output unit 150 is configured to provide outputs in a visual, audible, and/or tactile manner. The output unit 150 may include the display unit 270, an audio output module 214, an alarm unit 153, a haptic module 154, and the like.

The display unit 270 may display information processed in the mobile terminal 100. For example, when the mobile terminal 100 is in a phone call mode, the display unit 270 may display a User Interface (UI) or a Graphic User Interface (GUI) associated with a call or other communication (such as text messaging, multimedia file downloading, etc.). When the mobile terminal 100 is in a video call mode or image capturing mode, the display unit 270 may display a captured image and/or received image, a UI or GUI that shows videos or images and functions related thereto, and the like.

The display unit 270 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 270 may also be implemented to be optically transparent. Under this configuration, a user can view an object positioned at a rear side of a body through a region occupied by the display unit 270 of the body.

The display unit 270 may be implemented in two or more in number according to a configured aspect of the mobile terminal 100. For instance, a plurality of displays may be arranged on one surface integrally or separately, or may be arranged on different surfaces.

Here, if the display unit 270 and a touch sensitive sensor (referred to as a touch sensor) have a layered structure therebetween, the structure may be referred to as a touch screen. The display unit 270 may be used as an input device rather than an output device. The touch sensor may be implemented as a touch film, a touch sheet, a touch pad, and the like.

The touch sensor may be configured to convert changes of a pressure applied to a specific part of the display unit 270, or a capacitance occurring from a specific part of the display unit 270, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 270 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch and proximity touch patterns (e.g., distance, direction, speed, time, position, moving status, etc.). Information relating to the sensed proximity touch and the sensed proximity touch patterns may be output onto the touch screen.

The audio output module 214 may convert and output as sound audio data received from the wireless communication unit 110 or stored in the memory 160 in a call signal reception mode, a call mode, a record mode, a voice recognition mode, a broadcast reception mode, and the like. Also, the audio output module 214 may provide audible outputs related to a particular function performed by the mobile terminal 100 (e.g., a call signal reception sound, a message reception sound, etc.). The audio output module 214 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 270 or the audio output module 214. Accordingly, the display unit 270 or the audio output module 214 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 226 may generally be implemented to interface the mobile terminal with external devices. The interface unit 226 may allow a data reception from an external device, a power delivery to each component in the mobile terminal 100, or a data transmission from the mobile terminal 100 to an external device. The interface unit 226 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 226 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 227 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
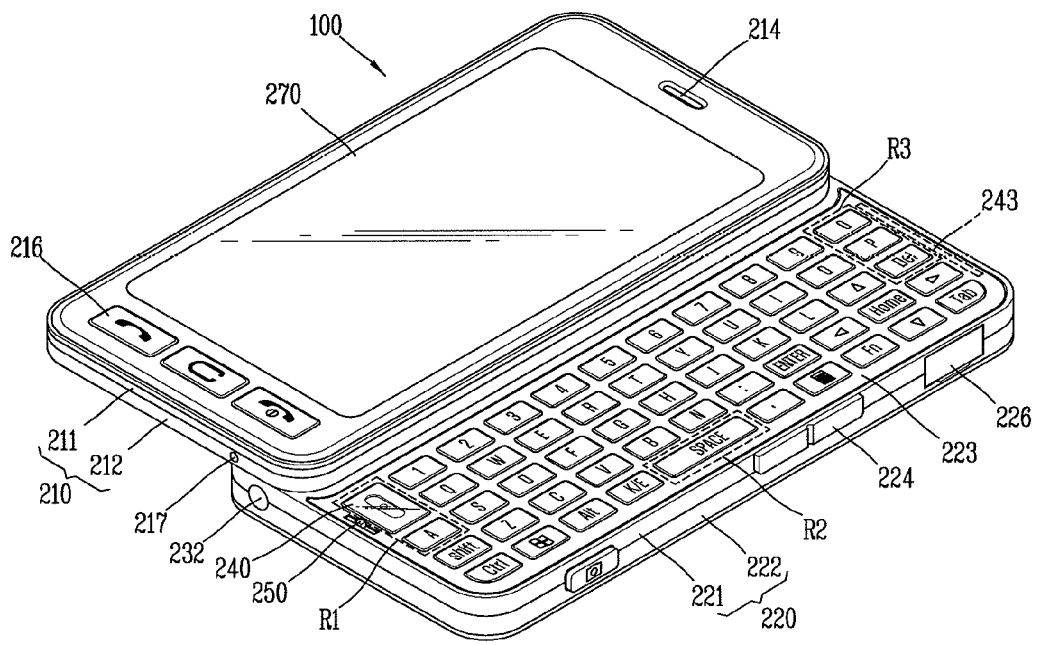
FIG. 2 is a front perspective view of a mobile terminal according to the present disclosure.

FIG. 2 is a front perspective view of the mobile terminal according to one embodiment of the present invention. Referring to FIG. 2, the mobile terminal 100 includes a first body 220, and a second body 210 coupled to the first body 220 so as to perform a relative sliding motion along at least one direction.

A state that the first body 220 and the second body 210 are arranged to overlap each other may be called a 'closed configuration'. As shown in FIG. 2, a state that one or more parts of the second body 210 are exposed as the first body 220 moves to one direction may be called an 'open configuration'.

The mobile terminal 100 operates in a standby mode in the closed configuration. However, the standby mode may be released according to a user's manipulations. The mobile terminal 100 operates in a call mode, etc. in the open configuration. However, the call mode may be converted into the standby mode according to a user's manipulation or a lapse of time.

A case which forms an outer appearance of the second body 210 may include a first front case 211 and a first rear case 212. A space formed by the first front case 211 and the first rear case 212 may accommodate various components therein. At least one intermediate case may further be disposed between the first front case 211 and the first rear case 212. Such cases may be formed by injection-molded synthetic resin, or may be formed using a metallic material such as stainless steel (STS) or titanium (Ti).

At the first front case 211 of the second body 210, may be disposed the display unit 270, the audio output unit 214, and the first user input unit 216. The display unit 270 includes a liquid crystal display (LCD), an organic light emitting diodes (OLED) each for displaying information in a visual manner, or the like.

The display unit 270 may be provided with a touch pad overlapping therewith in a layered structure. Under this configuration, the display unit 270 may operate as a touch screen, thereby allowing a user's input in a touch manner. The audio output module 214 may be implemented as a receiver or a speaker. The first user input unit 216 may be provided with input keys such as a joystick key, a touch pad, a track ball, a pointing stick and a finger mouse.

A case which forms an outer appearance of the first body 220 may include a second front case 221 and a second rear case 222. The second user input unit 223 may be disposed on the front surface of the second front case 221 of the first body 220. The third user input unit 224 and the microphone 217 may be disposed on at least one of the second front case and the second rear case.

The second user input unit 223 is configured to input commands for controlling the operation of the mobile terminal, i.e., commands such as START, END and SCROLL, numbers, texts, symbols or the like. The second user input unit 223 may be implemented as a QWERTY type keyboard. The QWERTY type keyboard may include key buttons arranged in a QWERTY manner, and key information (e.g., texts, numbers, symbols, etc.) for key input is displayed on the key buttons. The key buttons may be disposed on a dome switch.

The second user input unit 223 may include any type of ones that can be manipulated in a user's tactile manner. For instance, the user input units 216, 223 and 224 may be implemented as a dome switch or a touch pad for receiving a command or information by a user's push or touch operation. Alternatively, the user input units may be implemented as a wheel for rotating a key, or a jog wheel or a jog switch.

The first user input unit 224 may operate as hot keys for activating a specific function of the mobile terminal. The microphone 217 may be implemented in an appropriate form to input a user's voice, other sounds, etc.

A sliding sensor 243 may be provided on at least one of the first body 220 and the second body 210. When the first body 220 and the second body 210 performs sliding within a predetermined range, the sliding sensor 243 senses this sliding thus to output a sensing signal.

Figure 3:
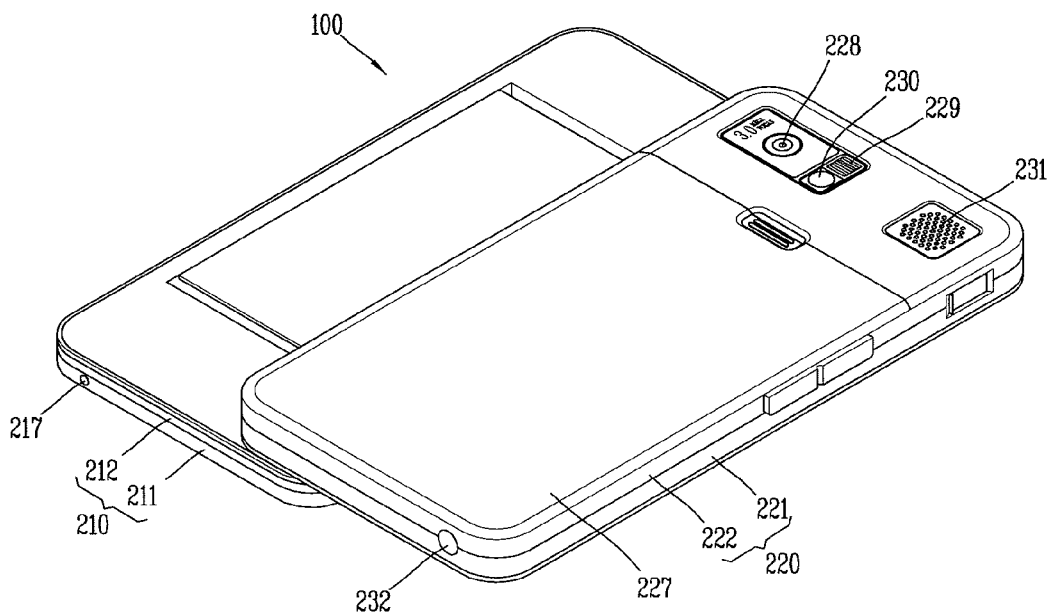
FIG. 3 is a rear perspective view of the mobile terminal of FIG. 2.

FIG. 3 is a rear perspective view of the mobile terminal of FIG. 2. Referring to FIG. 3, the second image input unit 228, a fourth user input unit and the power supply unit 227 may be mounted on the rear surface of the second rear case of the first body 210.

The second image input unit 228 has a capturing direction in an opposite manner to the first image input unit 240, and may have pixels different from those of the first image input unit 240. For example, the first image input unit 240 may operate with relatively lower pixels (lower resolution).

Thus, the first image input unit 240 may be useful when a user can capture his face and send it to a calling party in a video call mode or the like. On the other hand, the second image input unit 228 may operate with a relatively higher pixels (higher resolution) such that it can be useful for a user to obtain higher quality pictures for later use. A flash 229 may be additionally disposed close to the second image input unit 228. When capturing an object by using the second image input unit 228, the flash 229 provides light to the object. The fourth user input unit may be implemented as a wheel, and may operate as a key for a specific function (e.g. scroll) of the mobile terminal.

The interface 226 may serve as a passage through which the mobile terminal 100 of the present disclosure exchanges data with an external device. For instance, the interface 226 may be implemented as at least one of a wired/wireless connection port for connecting an earphone to the mobile terminal, a short-range communications port, power supply ports for providing power to the portable terminal, or the like. The interface 226 may be configured using a card socket (e.g., for coupling to a memory card, a subscriber identity module (SIM) card, a user identity module (UIM) card, etc.).

The power supply unit 227 may be a rechargeable battery, for example, to be detachably mounted to the second body 210 for charging.

Part of a slide module which slidably couples the first body 220 and the second body 210 to each other is disposed at the first rear case of the first body 220. Another part of the slide module may be disposed at the second front case of the second body 210, thus not to be exposed to the outside.

As shown in FIG. 3, the sliding sensor 243 is arranged on one of the first body 220 and the second body 210. Alternatively, the sliding sensor 243 may be arranged at a hinge which connects the first body 220 and the second body 210 with each other.

Hereinafter, the relation between the image input unit and the mobile terminal will be explained in more details with reference to the attached drawings. The aforementioned terms may be differently described within the scope of claims.

Figure 4:
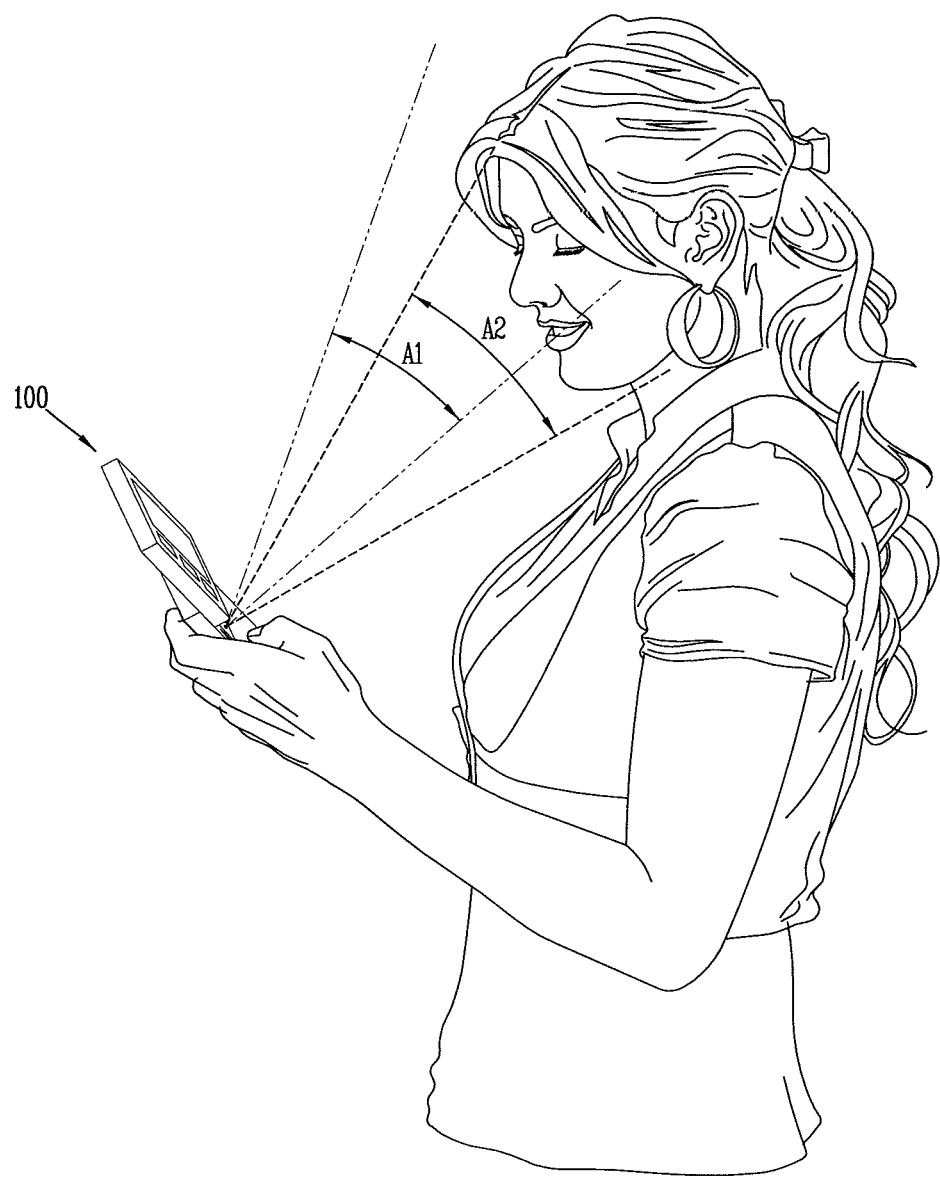
FIG. 4 is a view illustrating a relation between an inclined angle of an image input unit and a capturing region according to the present disclosure.

FIG. 4 is a view illustrating a relation between an inclined angle of an image input unit and a capturing region according to the present disclosure. Referring to FIGS. 2 and 4, the second user input unit 223 is disposed on one surface of the first body 220. The first image input unit (first camera) 240 is formed at the user input unit 223. The first image input unit 240 may be implemented to capture a still image or a moving image of a user, etc.

Because the second body does not include the image input unit, the mobile terminal may have a slim configuration. Furthermore, since both of the first and second image input units are formed at the first body 220 during manufacturing processing of the mobile terminal, the entire manufacturing processing may be simplified and productivity may be enhanced.

When the first image input unit 240 is formed at the first body 220, the first image input unit 240 may be frequently blocked by a user when the user inputs characters using keys. Especially, when the first image input unit 240 is blocked by a user who is manipulating keys of a mobile terminal having a function of a video call or video chatting, a video call or video chatting may not be normally performed.

In order to solve such problems, as shown in FIG. 2, the first image input unit 240 may be disposed on regions which may not be frequently blocked by a user (second regions corresponding to R1, R2 and R3 of FIG. 2), rather than on regions which may be frequently blocked by a user (first regions, one surface of the user input unit rather than R1, R2 and R3 of FIG. 2).

More specifically, the region R2 indicates a central region of the user input unit 223 where the thumbs of two hands intersect, and the regions R1 and R3 indicate the left and right upper ends of the user input unit 223 where the little fingers of two hands are placed.

When a user performs a video call or video chatting using the mobile terminal, the user's face is input to the mobile terminal through the first image input unit 240. However, if the first image input unit 240 is fixed, only a region facing one surface of the first body 220 is captured. In this case, the user should incline the mobile terminal in order to control a capturing region so that his or her face may be precisely input to the mobile terminal.

As shown in FIG. 4, when the mobile terminal is in an inclined state, a region captured by the first image input unit corresponds to 'A1'. Therefore, in order to precisely capture a user's face, the gradient of the mobile terminal should be controlled, or the gradient of the first image input unit 240 should be controlled so that the region captured by the first image input unit may extend to 'A1'.

In the first and second embodiments of the present disclosure, the first image input unit 240 is rotatable centering around one point of the terminal body. This may allow the capturing region to be controlled. That is, the capturing region may be controlled to 'A2' from 'A1'.

Figure 5:
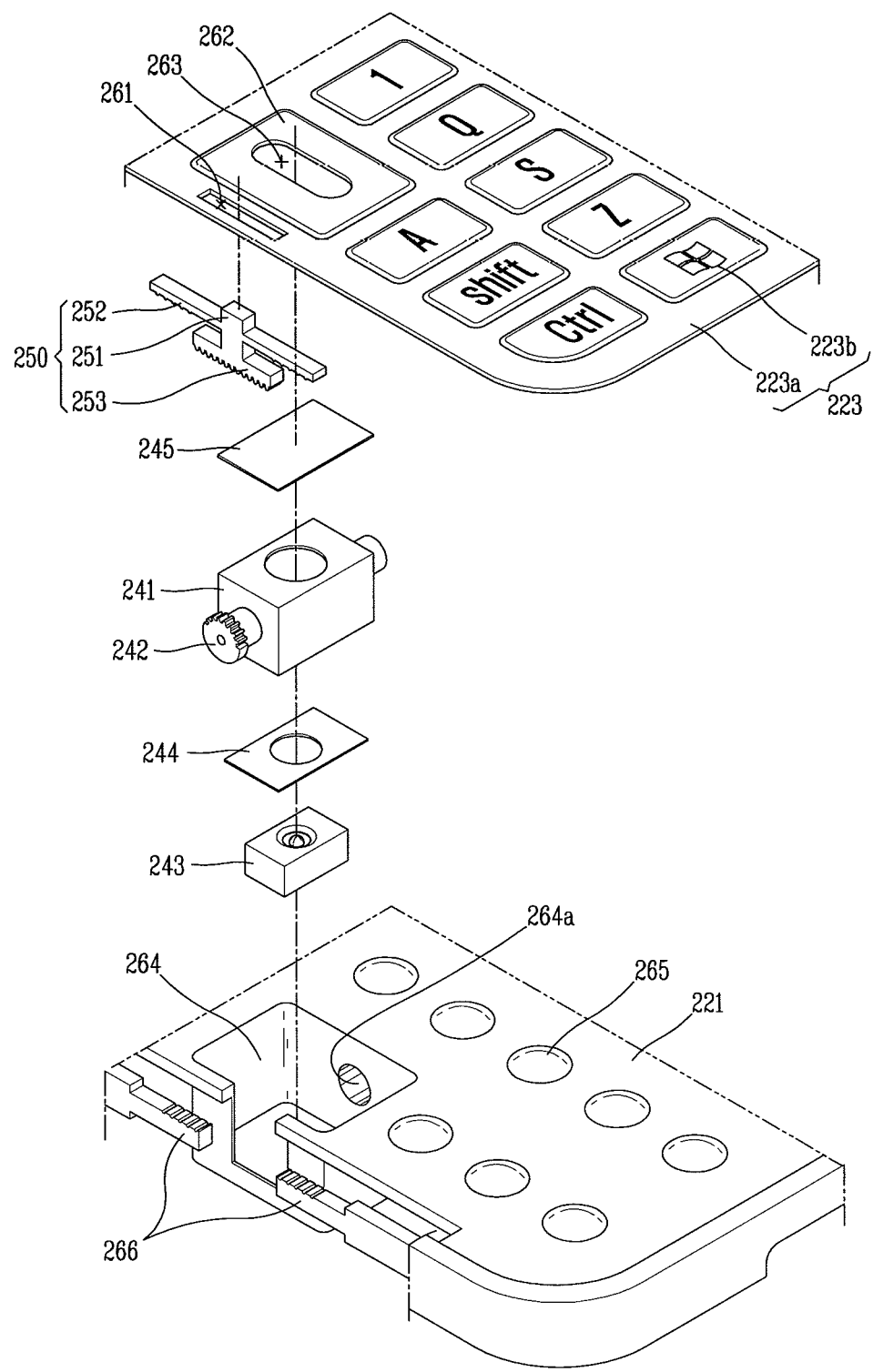
FIG. 5 is a disassembled perspective view of an image input unit disposed at a user input unit of FIG. 2 according to a first embodiment of the present disclosure.
Figure 6:
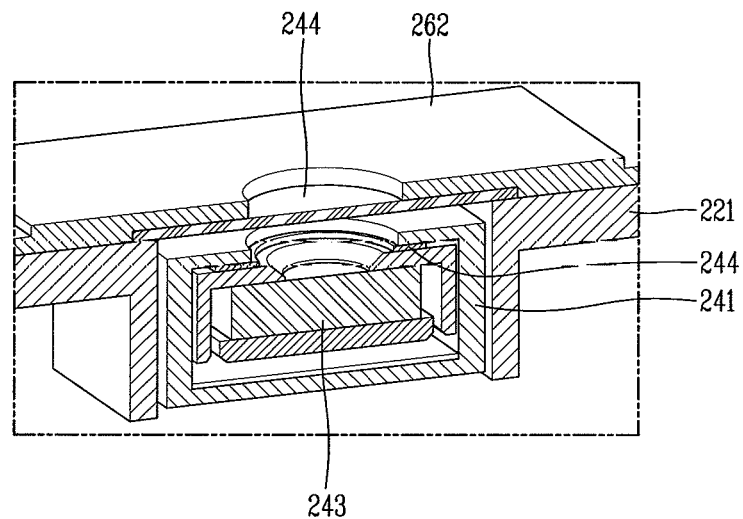
FIG. 6 is a sectional view of a user input unit and an image input unit according to a first embodiment of the present disclosure.
Figure 7:
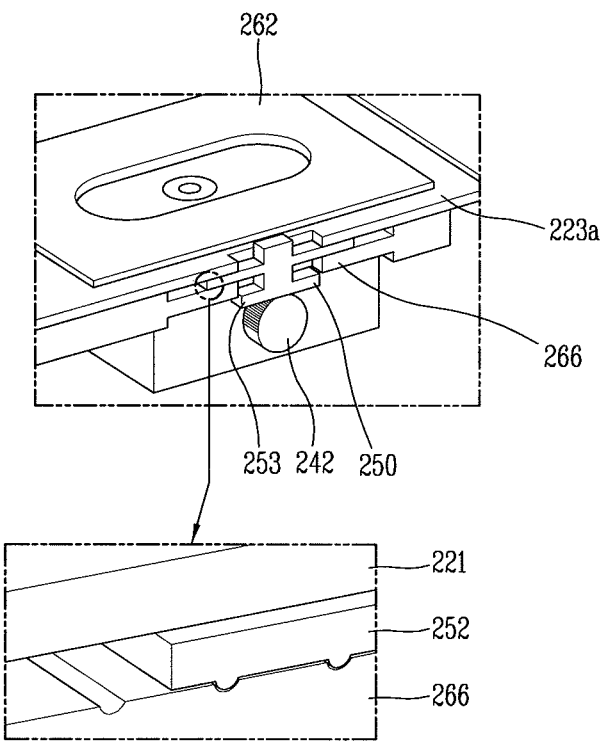
FIG. 7 is a sectional view of a slit and a knob unit according to a first embodiment of the present disclosure.

Next, FIG. 5 is a disassembled perspective view of an image input unit disposed at the user input unit of FIG. 2 according to a first embodiment of the present disclosure, FIG. 6 is a sectional view of a user input unit and an image input unit according to a first embodiment of the present disclosure, and FIG. 7 is a sectional view of a slit and a knob unit according to a first embodiment of the present disclosure.

Referring to FIG. 5, the user input unit 223 includes a key frame 223a and key bodies 223b. The key frame 223a is coupled to one surface of the first body 220 for covering, and is provided with one or more holes 263. The hole 263 may long extend in one direction so that the first image input unit 240 may control a capturing region.

In the first embodiment, the hole 263 long extends in a sliding direction so as not to interfere with the key frame 223a, and so as to control the capturing region more smoothly. The hole 263 may extend up to the inside of the second front case 221.

Each of the key bodies 223b is coupled to the key frame 223a, and is provided with a key mark on one surface thereof so that text information may be input. Here, the key mark indicates one of characters (e.g., alphabets including vowels and consonants) which can form a word in an independent or combined manner, numbers and symbols. The key bodies 223b and the key frame 223a may be integrally formed with each other. Alternatively, the key bodies 223b additionally fabricated may be coupled to the key frame 223a.

Referring to FIGS. 5 and 6, the first image input unit 240 is disposed at the hole 263 of the user input unit 223. As aforementioned, the hole 263 is formed at the second region of the first body 220 (region corresponding to R1, R2 and R3 of FIG. 2).

A window may be disposed to block the hole 263. The window 245 may be configured to prevent foreign materials from being introduced into the first body 220, and may serve as a second lens with respect to a camera module 243 of the first image input unit 240. That is, the window 245 may serve as a convex or concave lens for the camera.

A window cover 262 may be formed to cover the window 245. The window cover 262 may be integrally formed with the key frame 223a. A pad 244 configured to protect the camera module 243 from an external impact is disposed between the window 245 and the camera module 243. The camera module 243 is mounted in a housing 241. The housing 241 may be provided with a through hole, and a circuit board and the camera module 243 may be connected to each other by an FPCB via the through hole.

The housing 241 may be disposed at an accommodation portion 264 of the case of the first body 220. The accommodation portion 264 is formed in an inward recessed manner from one surface of the first body 220. Under this configuration, the first image input unit 240 does not protrude beyond one surface of the first body 220. Accordingly, the first body 220 or the second body 210 can perform sliding motion with respect to each other, without being restricted by the first image input unit 240.

A shaft 242 is disposed on at least one end of the housing 241. A supporting unit 264a is formed on one side surface of the accommodation portion 264 in correspondence to the shaft 242. Rotations of the shaft 242 are supported by the supporting unit 264a.

Referring to FIG. 7, a slit portion 261 is formed close to a hole where the first image input unit 240 is disposed. The slit portion 261 may be implemented as a hole penetratingly formed at the key frame 223a.

A knob portion 250 slidably formed so as to control the gradient of the housing 241 may be formed at the slit portion 261. The knob portion 250 may include a protruded portion 251 protruded towards the outside of the slit portion 261, and a control bar 253 disposed inside the slit portion 261.

Part 252 of the knob portion 250 may be disposed at a gap between the key frame 223a and a supporting surface 266 extending from the first body 220. Under this configuration, the part 252 of the knob portion 250 may perform sliding motion at the gap.

Grooves or protrusions may be formed on one surface of the control bar 253. Grooves or protrusions may be formed at the shaft 242 in correspondence to the grooves or protrusions of the control bar 253. Once the protruded portion 251 performs sliding, the protrusions or grooves of the shaft 242 corresponding to the grooves or protrusions of the control bar 253 move in an engaged state. The movement of the protrusions of the shaft 242 in an engaged state with the grooves of the control bar 253 leads the shaft 242 connected to the housing 241 to rotate. This may allow a gradient of the housing 241 to be controlled. That is, a gradient of the first image input unit 240 may be controlled by up-down moving the protruded portion 251 of the knob portion 250. This may allow a region captured by the first image input unit 240 to be controlled.

Figure 8:
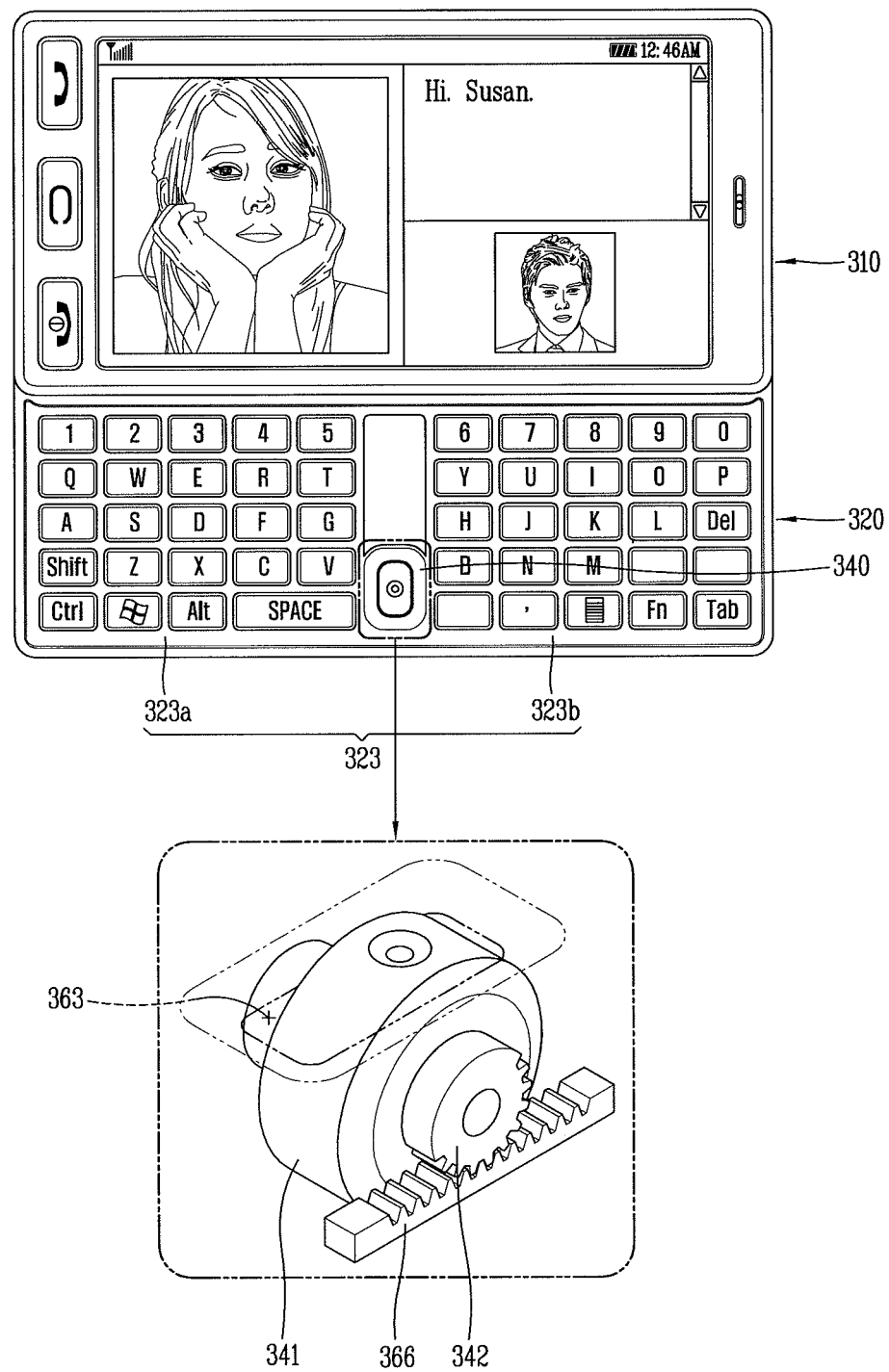
FIG. 8 is a conceptual view of a mobile terminal and an image input unit according to a second embodiment of the present disclosure.

FIG. 8 is a conceptual view of a mobile terminal and an image input unit according to a second embodiment of the present disclosure. As shown, a first image input unit 340 is disposed at a lower end of a middle region of a user input unit 323. More specifically, the first image input unit 340 is disposed at a hole 363 formed at a lower end of a middle region of a key frame of the user input unit 323.

The user input unit 323 is implemented as two user input units spaced from each other, at the right and left sides based on the middle region where the first image input unit 340 is disposed. The two user input units may be a first user input unit portion 323a and a second user input unit portion 323b. The middle region indicates a region where the first image input unit 340 is not frequently blocked by a user's manipulation.

The first image input unit 340 includes a housing 341, and a camera module mounted in the housing 341. The housing 341 is provided with a through hole. Via the through hole, the circuit board and the camera module may be connected to each other by the FPCB.

The housing 341 may be formed so as to be rotatable in a sliding direction with respect to the first body 320. As an example, a shaft 342 may be formed on at least one end of the housing 341, and the first body 320 may include a supporting plate 366 for supporting the shaft 342. The shaft 342 and the supporting plate 366 include grooves and protrusions engaged with each other. When the housing 341 rotates, the shaft 342 and the supporting plate 366 rotate in an engaged state. When the rotation of the housing 341 is stopped, the supporting plate may support the shaft 342 so as to maintain the stopped state.

Part of the housing 341 exposed through a hole of the key frame 323a, or a contact part of the hole to the housing 341 may be formed of an elastic material such as rubber. As the exposed part and the contact part are formed of an elastic material, a gap between the housing 341 and the hole may be minimized. This may prevent foreign materials from being introduced into the hole.

FIGS. 9A through 9E are conceptual views illustrating a usage state of the mobile terminal according to preferred embodiments of the present disclosure.

A plurality of executable applications may be displayed on a display unit 270 of the mobile terminal in the form of icons. Once a touch input is applied to the display unit 270 so that a specific application can be executed, a touched position is detected, and an application corresponding to an icon 271 disposed on the detected position is operated. That is, the applications of the mobile terminal are executed in a touch manner.

Figure 9A:
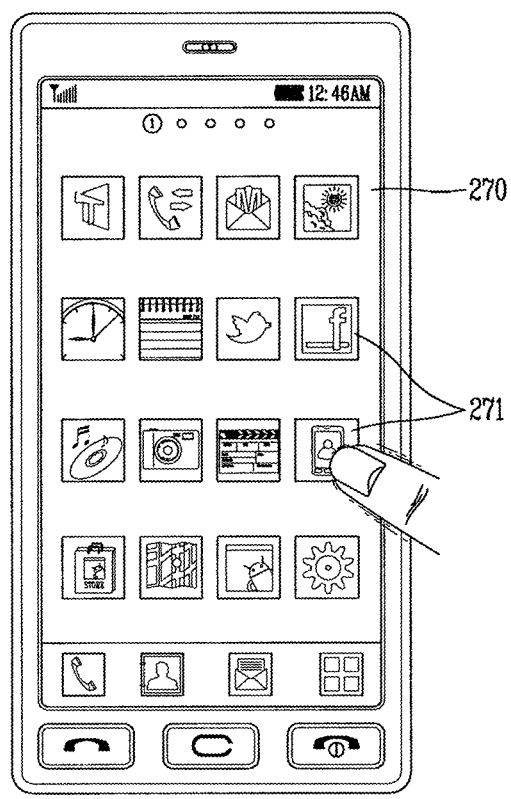
FIGS. 9A through 9E are conceptual views illustrating a usage state of a mobile terminal according to the present disclosure.

As shown in FIG. 9A, once a user's touch input is applied to the mobile terminal, a specific application is executed. As the specific application is executed, various equipment and electric devices associated with the application are operated. As an example, in case of a video chatting related application, when a user's touch input is applied to the mobile terminal, the user input unit 223 and the first image input unit 240 of the first body 220 are activated to implement an input standby state. Once the second body 210 performs sliding motion to implement an open state (a first state, i.e., a state where the first body 220 is exposed), information may be input from the user input unit 223 and the first image input unit 240.

Figure 9B:
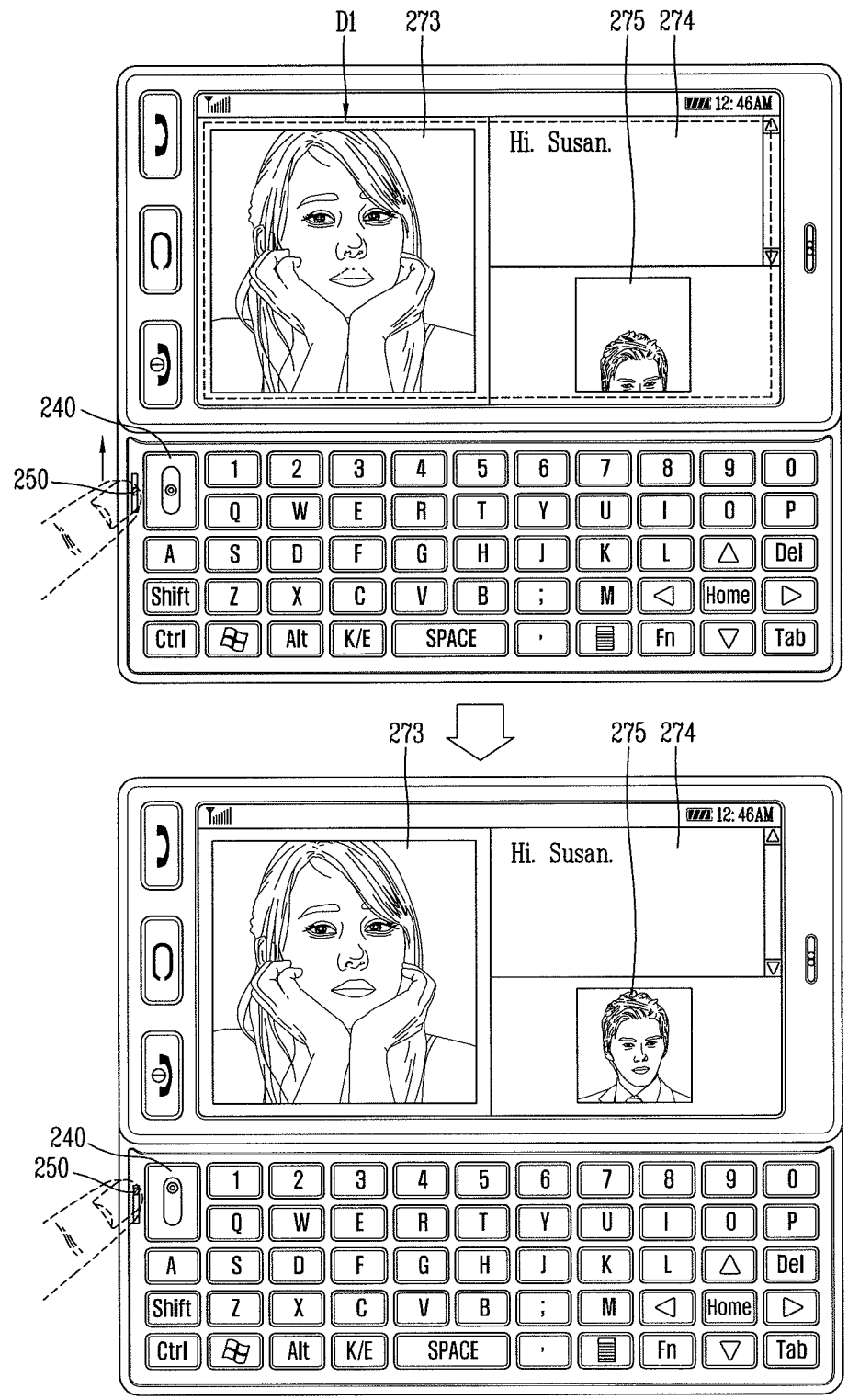

FIG. 9B illustrates that a user's image information 275, a calling party's image information 273, and text information 274 transmitted or received between the user and the calling party are displayed on the display unit 270 of the user's mobile terminal. The user's image information 275 is input through the first image input unit 240, and is transmitted to the calling party and displayed on the display unit of the user's mobile terminal.

If the user's image is not normal, the first image input unit 240 is manipulated so that the user's image can be normal. More specifically, in a case that the user's face is partially displayed or is not displayed at all, the knob portion 250 or the housing 241 may be manipulated so that the user's face can be normally input through the first image input unit 240.

The user can correct his or her image information to be transmitted to the calling party, through simple manipulations during a video call or video chatting. And, the first image input unit 240 is disposed at a second region of the user input unit 223 where an image input is not interfered when the user operates the user input unit 223 for text input. This may enhance the user's convenience.

Not only the user's image information 275, but also the calling party's image information 273 are displayed on the display unit 270. Furthermore, a user's text information input through the user input unit 223, and a calling party's text information are displayed on the display unit 270.

The user's image information 275, the calling party's image information 273 and the text information 274 may constitute a first screen (D1), and may be output to the display unit 270.

Figure 9C:
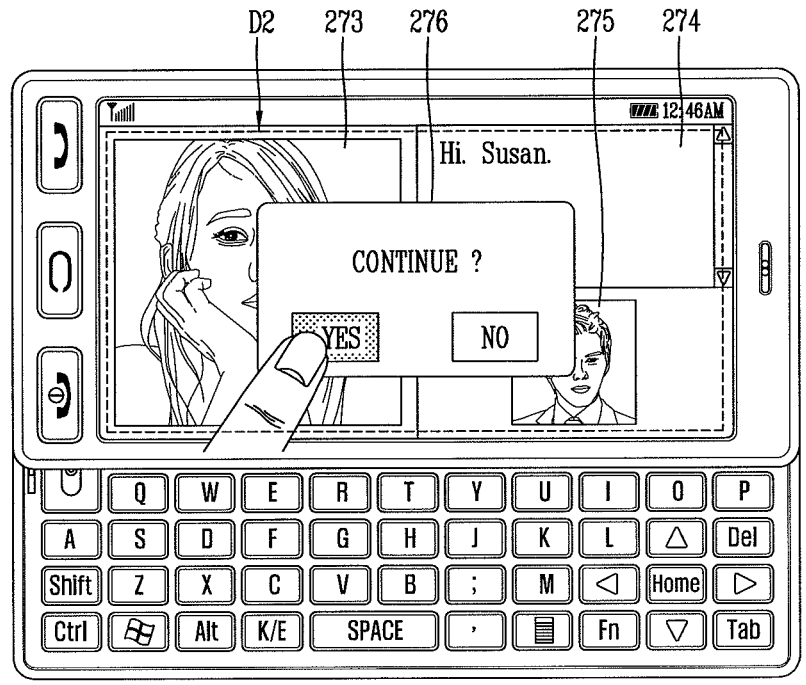

FIG. 9C illustrates a state that the first image input unit 240 is at least partially blocked by the second body 210 when the first body 220 or the second body 210 performs sliding motion.

When a user is to finish a video calling or video chatting, or when a call is originated from a calling party or a third party, the user may implement sliding motion so as to easily convert an operation mode of the mobile terminal. This sliding motion indicates an operation to block part of the first image input unit 240 by sliding motion of the first body 220 or the second body 210. In order to allow the user to recognize a changed operation mode of the mobile terminal, the screen may be changed as shown in FIG. 9C.

Once a blocked state of the first image input unit 240 is sensed by the sensor or the camera module 243 for sensing sliding motion of the mobile terminal, the display unit 270 may be converted into a second screen (D2) different from the first screen (D1).

More specifically, on the second screen (D2), a pop-up window 276 for inquiring a user whether to finish a video calling or video chatting may be newly displayed, or an originated phone number may be displayed.

Figure 9D:
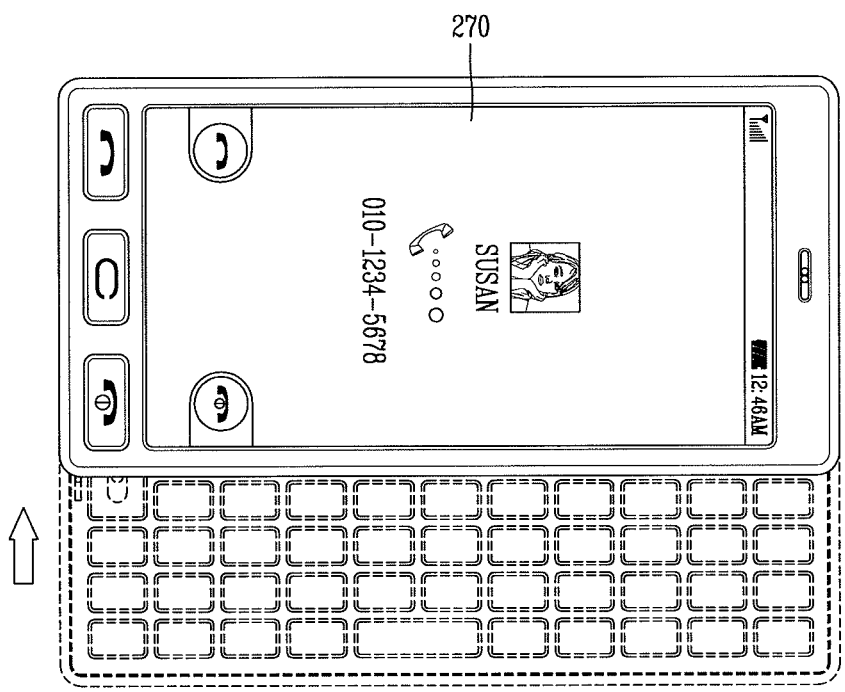
Figure 9E:
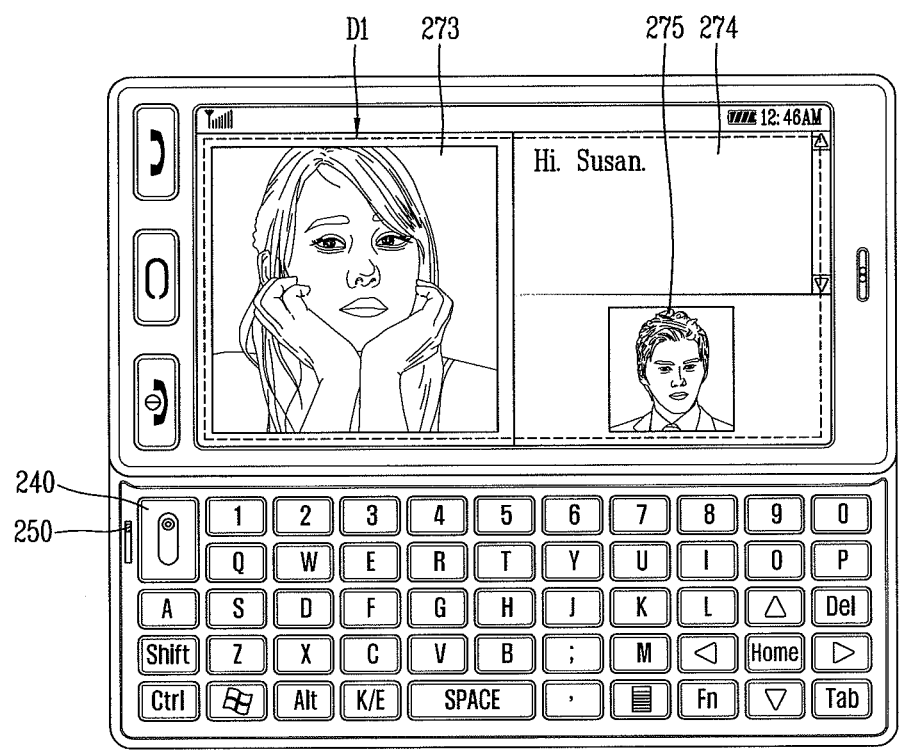

FIG. 9D illustrates that a calling party's information is displayed on the display unit 270 during a call. And, FIG. 9E illustrates that the current mode is restored to a video call mode or a video chatting mode once the user input unit 223 and the first image input unit 240 of the first body 220 are exposed, by sliding motion of the first body 220 or the second body 210 after completion of the call.

More specifically, after completion of the call, the current mode can be converted into the video call mode or the video chatting mode without requiring an additional key input. That is, once the first image input unit 240 is exposed by sliding motion of the first body 220 or the second body 210, the current mode may be restored to the video chatting mode as shown in FIG. 9E. Through the sliding motion of the first body 220 or the second body 210, the application of the mobile terminal may be activated or deactivated, and the operations of the first image input unit and the second image input unit may be controlled.

Figure 10A:
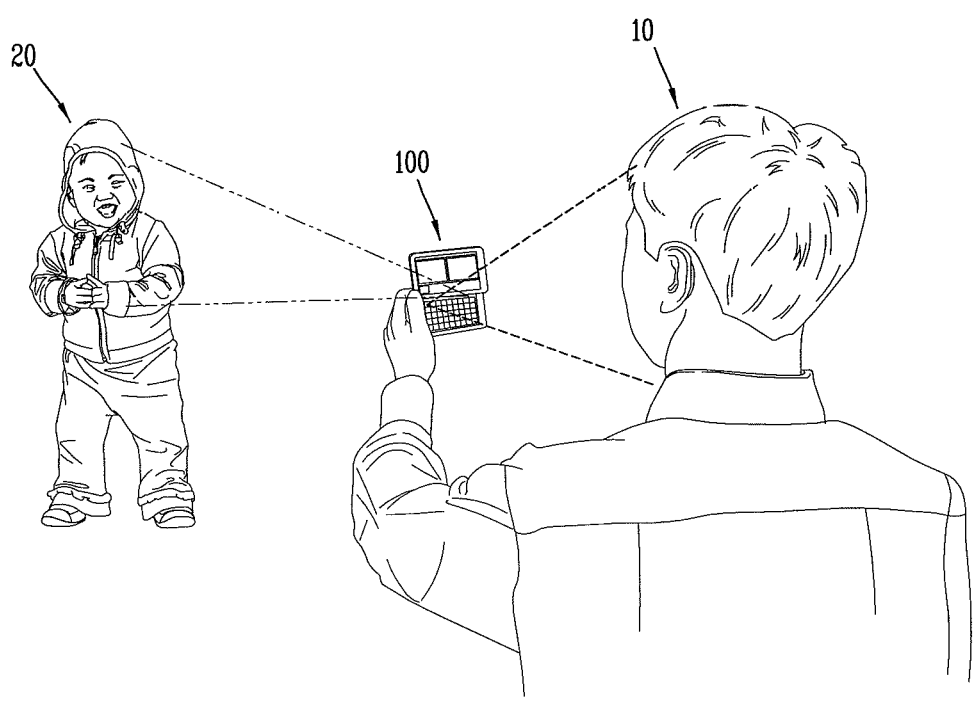
FIGS. 10A and 10B are conceptual views illustrating a usage state of a mobile terminal when a plurality of image input units operate according to the present disclosure.
Figure 10B:
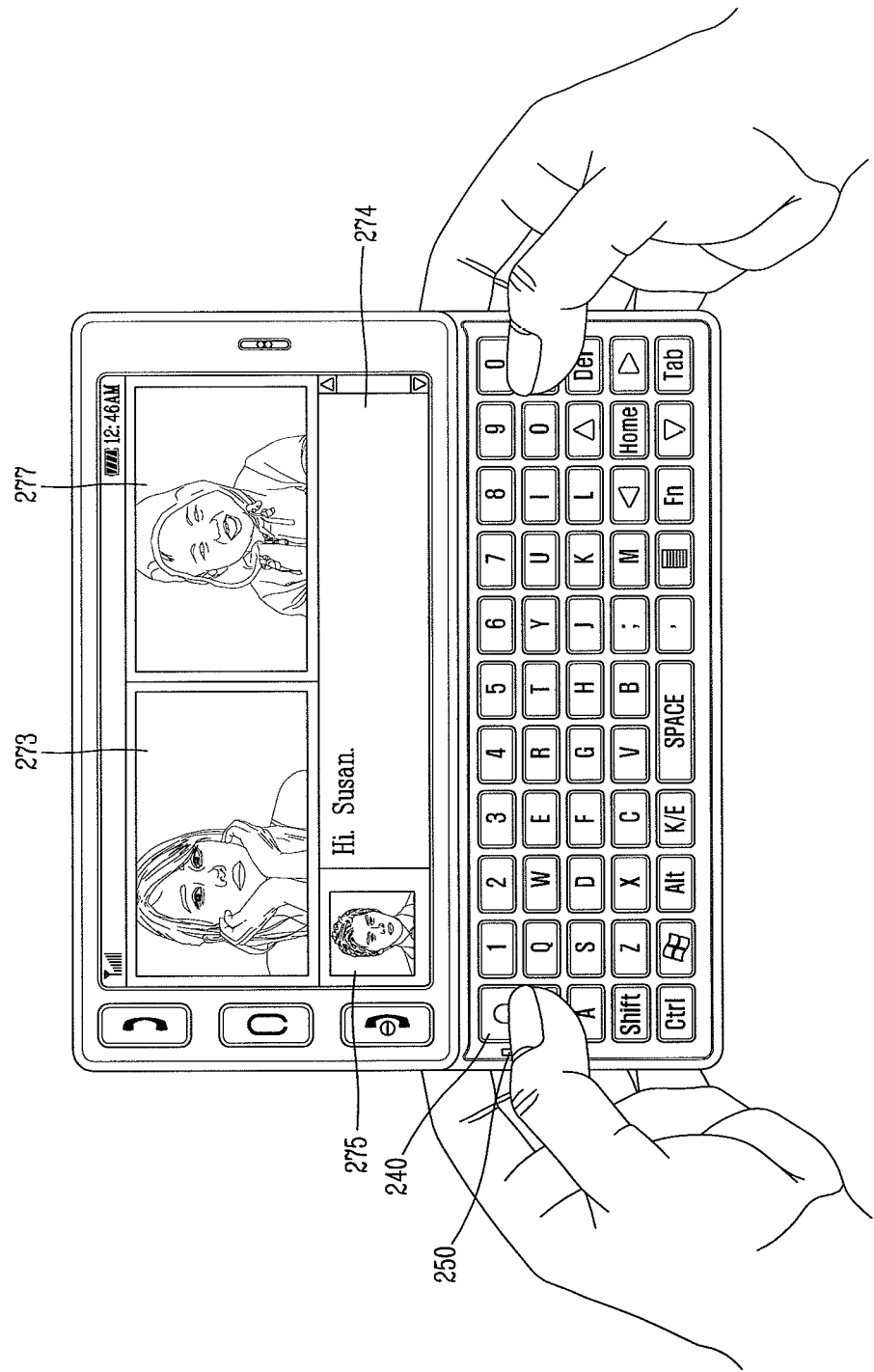

FIGS. 10A and 10B are conceptual views illustrating a usage state of a mobile terminal when a plurality of image input units operate according to the present disclosure.

In this embodiment, image input units 240 and 228 are disposed on one surface and another surface of the first body 220. Under this configuration, a user 10 can capture a background 20 located behind the rear surface of the mobile terminal.

While the user's image information 275 and the calling party's image information 273 are displayed on the display unit 270, the user can perform video chatting while capturing the background. Especially, in this embodiment, the first image input unit 240 can be controlled by any angle. Therefore, the user's image information 275 can be controlled while the background screen 277 is captured. For instance, when the user inclines the mobile terminal so as to capture the background disposed at the upside, the user's image information may be partially blocked. In this case, the knob portion 250 or the housing 241 is manipulated to control a capturing angle. Accordingly, the user's image information can be precisely provided in any situations.

Upon the sliding motion of the mobile terminal, the image input units 228 and 240 may be simultaneously operated, or one of them may be operated. That is, when the mobile terminal of FIG. 10A performs sliding motion thus to cause the first image input unit 240 to be blocked or deactivated, only the second image input unit 228 is operated to allow an image to be input to the mobile terminal.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a first body having an exposed portion at one surface thereof, the first body having a user input unit at the exposed portion;
    a second body slidably connected to the first body so as to be movable between a first state where the exposed portion is exposed and a second state where the user input unit is covered by the second body; and
    a first image input unit located at the exposed portion and exposed with the user input unit in the first state such that an external image is inputtable in the first state,
    wherein the external image inputtable to the first image input unit is an image of an external region facing the one surface,
    wherein the first image input unit is rotatably mounted at the first input unit to allow the angle of the first image input unit with respect to the external region to be changed, and
    wherein the user input unit includes:
        a key frame coupled to the one surface of the first body, the key frame having at least one hole, the first image input unit being located at the at least one hole; and
        key bodies coupled to the key frame, the key bodies having key marks on one surface thereof representative of text information inputtable by the key bodies.

2. The mobile terminal of claim 1, wherein an upper surface of the user input unit includes:
    first regions frequently blocked by a user when the user manipulates the key bodies; and
    second regions less frequently blocked by a user than the first regions, and
    wherein the first image input unit is disposed at one of the second regions.

3. The mobile terminal of claim 1, wherein the first image input unit includes:
    a housing having a camera module mounted therein; and a shaft protruding from at least one end of the housing, the housing being rotatable about an axis of the shaft such that a facing angle of the housing with respect to an object in the external region is adjustable.

4. The mobile terminal of claim 3, wherein the first body includes:
an accommodation portion configured to accommodate the housing therein; and
a supporting unit formed at a side surface of the accommodation portion, the supporting unit supporting the shaft.

5. The mobile terminal of claim 3, further comprising:
a slit provided in the key frame adjacent to the at least one hole where the first image input unit is disposed; and
a knob unit provided at the slit, the knob unit being manipulatable so as to control the facing angle of the housing.

6. The mobile terminal of claim 5, wherein the knob unit includes a control bar slidable in the same direction as the slit, and
wherein the shaft is formed to be rotatably engaged with the control bar such that a sliding movement imparted to the knob unit causes the housing to rotate.

7. The mobile terminal of claim 6, wherein the knob unit includes:
an extension portion having opposing ends extending along the slit; and
protrusion portions formed on a surface of the extension portion, and
wherein the first body includes grooves configured to cooperate with the protrusion portions such that sliding motion of the knob unit is controlled.

8. The mobile terminal of claim 1, further comprising:
a second image input unit located at another surface of the first body;
a sensing unit configured to sense sliding of the second body; and
a controller configured to control the operation of the first image input unit or the second image input unit according to a sensed sliding degree of the second body.

9. The mobile terminal of claim 8, wherein, when the second body is in a position between the first state and the second state that blocks at least part of the first image input unit, the controller is configured to switch the external image input through the first image input unit to a second external image input through the second image input unit.

10. The mobile terminal of claim 8, wherein, when the second body is in a position between the first state and the second state that blocks at least part of the first image input unit, the controller is configured to simultaneously operate the first and second image input units such that external images from both the first and second image input units are output to a display unit of the second body.

11. The mobile terminal of claim 1, wherein the user input unit includes first and second user input units spaced from each other, and
wherein the first image input unit is disposed at a space between the first and second user input units.

12. A mobile terminal comprising:
a first body having an exposed portion at one surface thereof, the first body having a user input unit at the exposed portion
a second body slidably connected to the first body so as to be movable between a first state where the exposed portion is exposed to the outside and a second state where the user input unit is covered by the second body, the second body having a display unit;
a first image input unit provided at the exposed portion and exposed with the user input unit in the first state such that an external image is inputtable in the first state;
a sensing unit configured to sense sliding of the second body; and
a controller configured to control the operation of the first image input unit according to a sensed sliding degree of the second body,
wherein the external image inputtable to the first image input unit is an image of an external region facing the one surface,
wherein the first image input unit is rotatably mounted at the first input unit to allow the angle of the first image input unit with respect to the external region to be changed, and
wherein the user input unit includes:
a key frame coupled to the one surface of the first body, the key frame having at least one hole, the first image input unit being located at the at least one hole; and
key bodies coupled to the key frame, the key bodies having key marks on one surface thereof representative of text information inputtable by the key bodies.

13. The mobile terminal of claim 12, wherein, when an application associated with a video call or video chatting is executed by the controller, the controller is configured to output a first screen to the display unit, the first screen including image information input from the first image input unit or text information input from the user input unit.

14. The mobile terminal of claim 13, wherein, when the second body is in a position between the first state and the second state that blocks at least part of the first image input unit, the first screen output to the display unit is converted into a second screen.

15. The mobile terminal of claim 14, wherein, when the second body is returned to the first state while the second screen is displayed, the second screen is re-converted into the first screen.

16. The mobile terminal of claim 12, further comprising a second image input unit provided at another surface of the first body such that a second external image is inputtable,
wherein the controller is configured to operate one of the first and second image input units according to the position of the second body with respect to the first and second states, and to display the external image associated with the operated image input unit.

17. The mobile terminal of claim 12, further comprising a second image input unit provided at another surface of the first body such that a second external image is inputtable,
wherein the controller is configured to operate both of the first and second image input units according to the position of the second body with respect to the first and second states, and to display the external images associated with each of the first and second image input units.

* * * * *